United States Patent [19]
Fujiwara et al.

[11] Patent Number: 5,793,447
[45] Date of Patent: Aug. 11, 1998

[54] DIGITAL CONVERGENCE APPARATUS

[75] Inventors: Masanori Fujiwara, Gyoda; Tsutomu Sakamoto, Fukaya; Yoshiji Tsuzuki, Honjo; Hisayuki Mihara, Saitama-ken; Toshio Obayashi, Fukaya, all of Japan

[73] Assignee: Kabushiki Kaisha Toshiba, Kawasaki, Japan

[21] Appl. No.: 689,262

[22] Filed: Aug. 6, 1996

[30] Foreign Application Priority Data

Sep. 8, 1995 [JP] Japan ................ 7-230876

[51] Int. Cl.$^6$ ................................ H04N 9/28
[52] U.S. Cl. ............... 348/807; 348/806; 315/368.13; 315/368.12
[58] Field of Search ............... 348/745, 746, 348/806, 807, 747; 315/368.13, 368.12, 368.11, 368.24; H04N 9/28

[56] References Cited

U.S. PATENT DOCUMENTS 4,977,446  12/1990  Shiomi et al. ................ 358/60
5,506,481  4/1996   Wada ................... 315/368.12
5,592,240  1/1997   Sakamoto ................ 348/807
5,694,181  12/1997  Oh ........................ 348/807

FOREIGN PATENT DOCUMENTS 0 431 902    6/1991   European Pat. Off. .
WO 90/10356  9/1990   WIPO .

Primary Examiner—Sherrie Hsia
Attorney, Agent, or Firm—Cushman Darby & Cushman IP Group of Pillsbury Madison & Sutro LLP

[57] ABSTRACT

A field memory stores convergence adjusting data which corresponds to a plurality of points on a display screen. An interpolation calculation circuit creates interpolation convergence adjusting data for correction points located between adjacent adjusting points, using a plurality of adjusting data items and interpolation coefficients. The output of the interpolation calculation circuit is subjected to digital/analog conversion and passed through a low-pass filter, thereby forming a convergence correction signal. This correction signal is supplied to each deflection coil. At the time of creating interpolation adjusting data for a point located between adjusting points, an optimal interpolation coefficient is output from a ROM or a ROM, depending upon whether the point is included in the odd or even field.

10 Claims, 8 Drawing Sheets

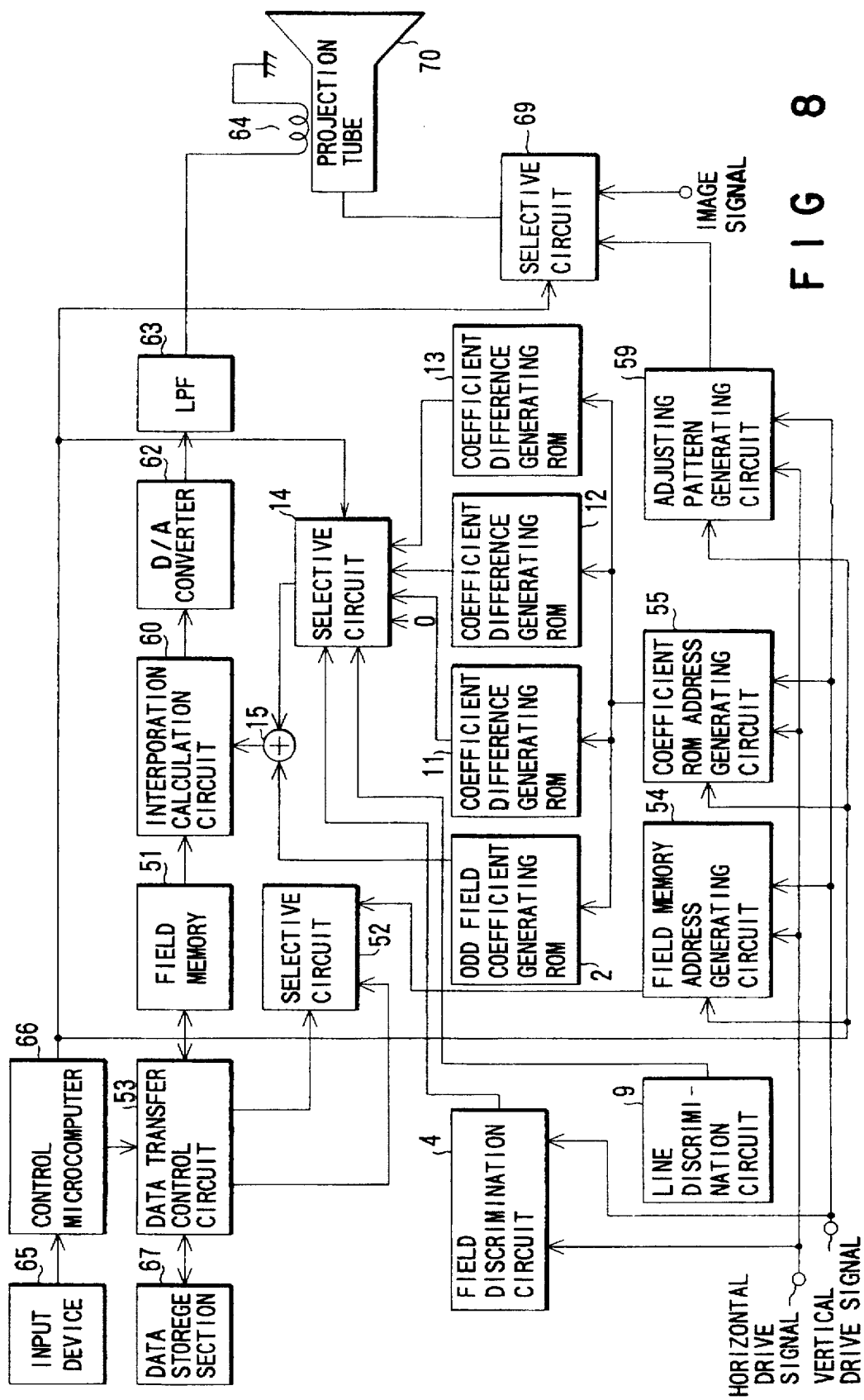

DIGITAL CONVERGENCE APPARATUS

BACKGROUND OF THE INVENTION

1. Field of the Invention

This invention relates to a digital convergence apparatus for use in a color television receiver, a RGB three-tube type color projector, etc., and more particularly to an apparatus of this type capable of performing convergence correction in response to various kinds of television signals.

2. Description of the Related Art

Large screens are now demanded. To meet this demand, large color television receivers or projection tube type color projectors are widely spread. In the projection tube type color projectors, image signals indicative of three elementary colors RGB are supplied to R-, G- and B-projection tubes, respectively, and images projected from the projection tubes are superposed upon each other on a screen, thereby creating a color image. However, since the projection tubes are positioned at different angles relative to the screen, misconvergence may well occur in the color image. To avoid this, a coil is provided for each projection tube, and a correction signal is supplied to the coil to make it generate a magnetic field for correcting the misconvergence and thereby to control the direction of deflection of electron beams emitted from the tube.

A digital convergence apparatus is now used as an apparatus for generating the correction signal. This apparatus stores, in its memory, convergence adjusting data corresponding to a plurality of adjusting points, which respectively correspond to a plurality of points on the screen. In synchronism with scanning, the convergence adjusting data is read from the memory, and converted to a convergence correction signal by digital/analog conversion. A convergence correction signal corresponding to a point on the screen interposed between adjacent adjusting points is created by obtaining interpolation convergence adjusting data as a result of interpolating convergence adjusting data corresponding to the adjacent points, and subjecting the interpolation convergence adjusting data to digital/analog conversion.

The interpolation convergence adjusting data includes data concerning the horizontal direction and data concerning the vertical direction.

In the conventional digital convergence apparatus, interpolation convergence adjusting data is created in both odd and even fields, using the same interpolation convergence adjusting data. Accordingly, an error will occur between an ideal scanning position and the actual scanning position corrected by convergence correction. For example, where convergence adjusting data is created concerning the odd field, an error will occur, in the even field, between an ideal scanning position and the actual scanning position corrected by convergence correction. This error will make it impossible to situate a scanning line, which is included in the even field, in the center position of adjacent scanning lines which are included in the odd field. In other words, the scanning lines will not be arranged at regular intervals because of the error. This phenomenon is called a pairing phenomenon, which will degrade the quality of an image. In the case of an apparatus with a screen size of 40 inches or less, the interval between adjacent scanning lines is not so large, and hence the degree of degradation in image quality due to the pairing phenomenon falls within an allowable range. However, as the screen is enlarged, the scanning-line interval increases, and accordingly the quality degradation due to the pairing phenomenon becomes conspicuous. Furthermore, in the recent projectors, the distance between the projection tubes and the screen is more and more shortened, and the size of the screen is more and more increased. In these projectors, the amount of convergence correction using the adjusting data much more increases, and the amount of the aforementioned error accordingly increases. As a result, image quality degradation due to the pairing phenomenon becomes unallowable.

SUMMARY OF THE INVENTION

It is the object of the invention to provide a digital convergence apparatus free from image quality degradation due to the pairing phenomenon.

According to an aspect of the invention, there is provided a digital convergence apparatus characterized by comprising:

adjusting data memory means storing convergence adjusting data for convergence adjustment, which corresponds to each of adjusting points corresponding to points on a display screen;

calculation means for calculating interpolation convergence adjusting data corresponding to correction points located between at least two adjacent ones of the adjusting points, using convergence data corresponding to the at least two adjacent adjusting points;

conversion means for converting a digital signal output from the calculation means, to an analog signal, thereby obtaining a convergence correction signal;

supply means for supplying the convergence correction signal from the conversion means to a convergence correction coil;

discrimination means for discriminating whether an image signal to be displayed on the display screen indicates a point included in a first field or in a second field; and coefficient supply means for setting, in the calculation means, a coefficient for the first field or for the second field on the basis of the discrimination result of the discrimination means.

Since the convergence adjusting data which has different values between the first (odd) field and the second (even) field is calculated, a convergence correction signal optimal to each field can be obtained, thereby eliminating image degradation.

According to another aspect of the invention, there is provided a digital convergence apparatus characterized by comprising:

adjusting data memory means storing convergence adjusting data for convergence adjustment, which corresponds to each of adjusting points corresponding to points on a display screen;

calculation means for calculating interpolation convergence adjusting data corresponding to correction points located between at least two adjacent ones of the adjusting points, using convergence data corresponding to the at least two adjacent adjusting points;

conversion means for converting a digital signal output from the calculation means, to an analog signal, thereby obtaining a convergence correction signal;

supply means for supplying the convergence correction signal from the conversion means to a convergence correction coil;

discrimination means for discriminating at least whether an image signal to be displayed on the display screen indicates a point on an odd line or on an even line; and coefficient supply means for setting, in the calculation means, a coefficient for the odd line or for the even line on the basis of the discrimination result of the discrimination means.

Since the convergence adjusting data which has different values between the odd line and the even line is calculated, a convergence correction signal optimal to each line can be obtained, thereby eliminating image degradation even in the case of a TV signal for non-interlace scanning.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 8 is a view, showing a seventh embodiment of the invention.

DETAILED DESCRIPTION OF THE PREFERRED EMBODIMENTS

Figure 1:
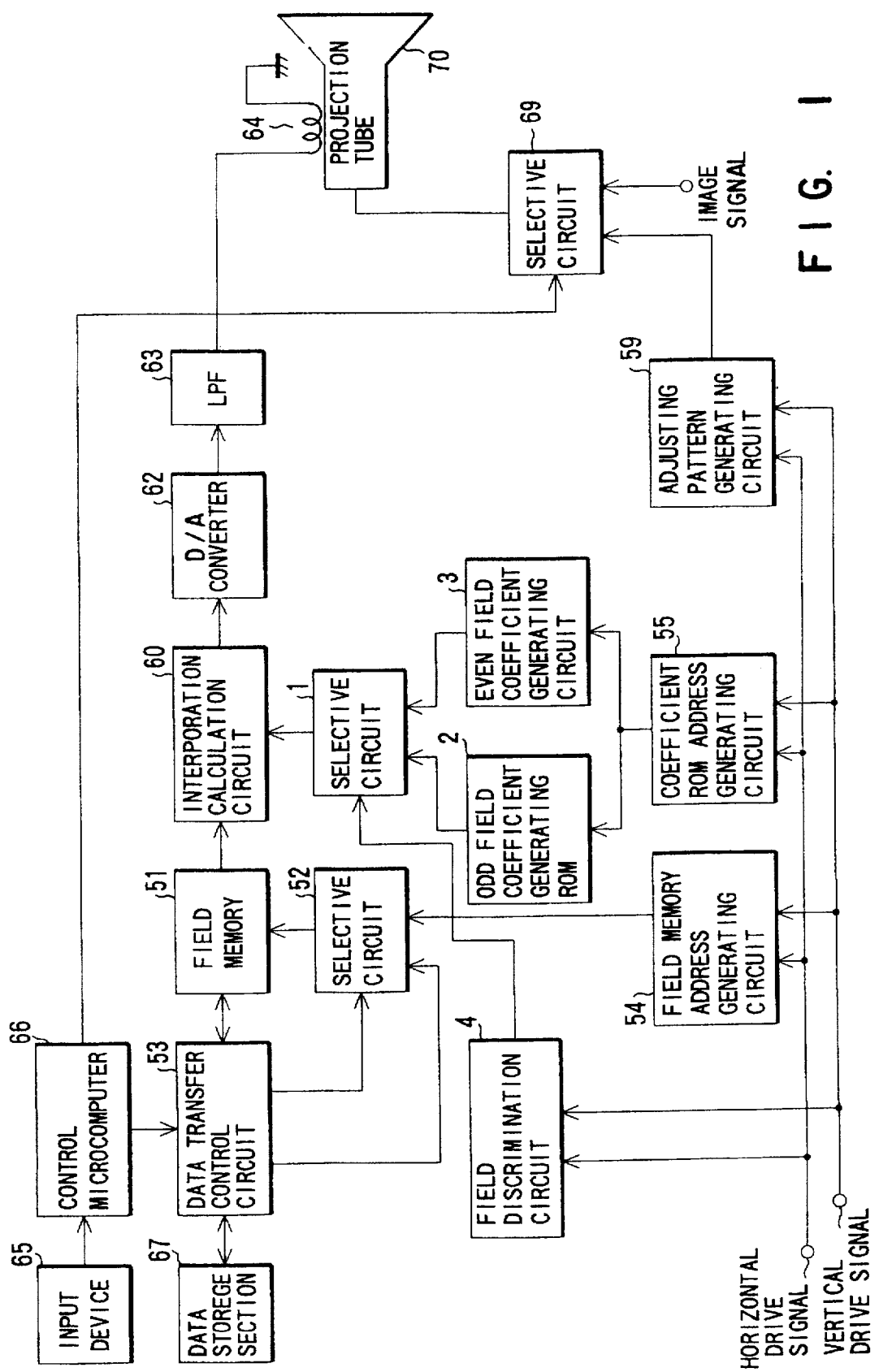
FIG. 1 is a view, showing a first embodiment of the invention.

The embodiments of the invention will be described with reference to the accompanying drawings.

First, for facilitating the understanding of the invention, an operation thereof assumed when the power supply is turned on, a normal operation, and an operation for convergence adjustment will be described in this order. The normal operation of the invention indicates an operation thereof which is assumed when a convergence correction signal is generated, and by which the invention is characterized.

When the power supply is turned on, the following operation is performed:

When the power supply of the projection type projector, etc. is turned on, a control microcomputer 66 starts to operate, thereby supplying a data transfer control circuit 53 with an instruction to transfer, to a field memory 51, adjusting data for adjusting points stored in a data storage section 67. In response to the instruction, the data transfer control circuit 53 reads the adjusting data from the data storage section 67, and writes the data into that area of the field memory 51 which is indicated by an address selected by a selective circuit 52.

In response to a control signal output from the data transfer control circuit 53, the selective circuit 52 selects one of an address output from the data transfer control circuit 53, and an address output from a field memory address generating circuit 54, and supplies the field memory 51 with the selected address. At the time of data transfer performed when the power supply is turned on, the selective circuit 52 selects the address from the data transfer control circuit 53 in response to an instruction from the circuit 53. The adjusting data from the data transfer control circuit 53 is written into that area of the field memory 51 to which the selected address is assigned.

Thus, the adjusting data for each adjusting point is stored in the field memory 51.

The convergence correction signal generating operation as the normal operation will be described briefly.

After data transfer at the time of turn-on of the power supply is completed, the data transfer control circuit 53 supplies the selective circuit 52 with an instruction to select the output of the field memory address generating circuit 54. The circuit 54 is supplied with a horizontal drive signal of a horizontal scanning cycle and a vertical drive signal of a vertical scanning cycle, and generates a read address based on the drive signals. The read address is supplied to the field memory 51 via the selective circuit 52.

Supposing that interpolation adjusting data is created which corresponds to a line between lines corresponding to adjusting data stored in the field memory 51. In accordance with the read address from the selective circuit 52, adjusting data corresponding to adjusting points of lines between which a target line is situated is read from the field memory 51 and supplied to an interpolation calculating circuit 60.

The interpolation calculating circuit 60 creates interpolation adjusting data by multiplying the adjusting data by a coefficient output from a selective circuit 1. The interpolation adjusting data is converted to an analog signal by means of a D/A converter 62. This analog signal serves as the convergence correction signal. The convergence signal has its high frequency component removed by a low-pass filter (LPF) 63, and then is supplied to a convergence correction coil 64 attached to a neck portion of each projection tube, thereby realizing convergence correction. The convergence correction signal corresponding to a scanning line which corresponds to the adjusting data stored in the field memory 51 is obtained by subjecting the adjusting data read from the memory 51 to D/A conversion.

A convergence adjusting procedure will now be described.

First, the operator (adjuster) supplies, via an input device 65, the control microcomputer 66 with an instruction to start adjusting. The control microcomputer 66 in turn supplies a selective circuit 69 with an instruction to select an adjusting pattern output from an adjusting pattern output circuit 59. As a result, a projection tube 70 projects an image such as a cross-hatching image which can easily be convergence-adjusting.

While observing the image projected on the screen, the operator supplies, via the input device 65, the control microcomputer 66 with an instruction to increase or reduce the amount of adjusting data. Upon receiving the instruction, the control microcomputer 66 updates the adjusting data for the adjusting points stored in the field memory 51 and the data storage section 67, thereby performing convergence adjustment. After the adjustment is finished, the operator supplies, via the input device 65, the control microcomputer 66 with an instruction to finish the adjustment. The control microcomputer 66 in turn supplies the selective circuit 69 with an instruction to select a terminal to which an image signal is input, with the result that a normal image is projected from the projection tube 70.

The apparatus of the invention especially has an odd field coefficient generating ROM 2 and an even field coefficient generating ROM 3. One of the outputs of the odd and even coefficient generating ROMs 2 and 3 is selected by the selective circuit 1 and supplied to the interpolation calculating circuit 60. The selective circuit 1 is controlled by a discrimination signal output from a field discrimination circuit 4 for discriminating the type of a field using the horizontal drive signal and the vertical drive signal. The selective circuit 1 selects a coefficient output from the odd field coefficient generating ROM 2 when the discrimination signal indicates an odd field, and selects a coefficient output from the even field coefficient generating ROM 3 when it indicates an even field. A read address assigned to each data item stored in each of the odd field coefficient generating ROM 2 and the even field coefficient generating ROM 3 is created by a coefficient ROM generating circuit 55 using the horizontal drive signal and the vertical drive signal.

As described above, appropriate interpolation adjusting data is created, regarding whether the type of the field is the odd field or the even field. As a result, an optimal convergence correction signal free from the pairing phenomenon is obtained.

The principle of the convergence correction will be explained in more detail.

If vertical interpolation is performed on the basis of data concerning four adjusting points (i.e. tow upper adjusting points and two lower adjusting points with respect to the line to be interpolated), very accurate interpolation can be realized. In this embodiment, however, interpolation is performed, for easy understanding, on the basis of data concerning only two adjusting points (a single upper point and a single lower point with respect to the to-be-interporated line).

Figure 2:
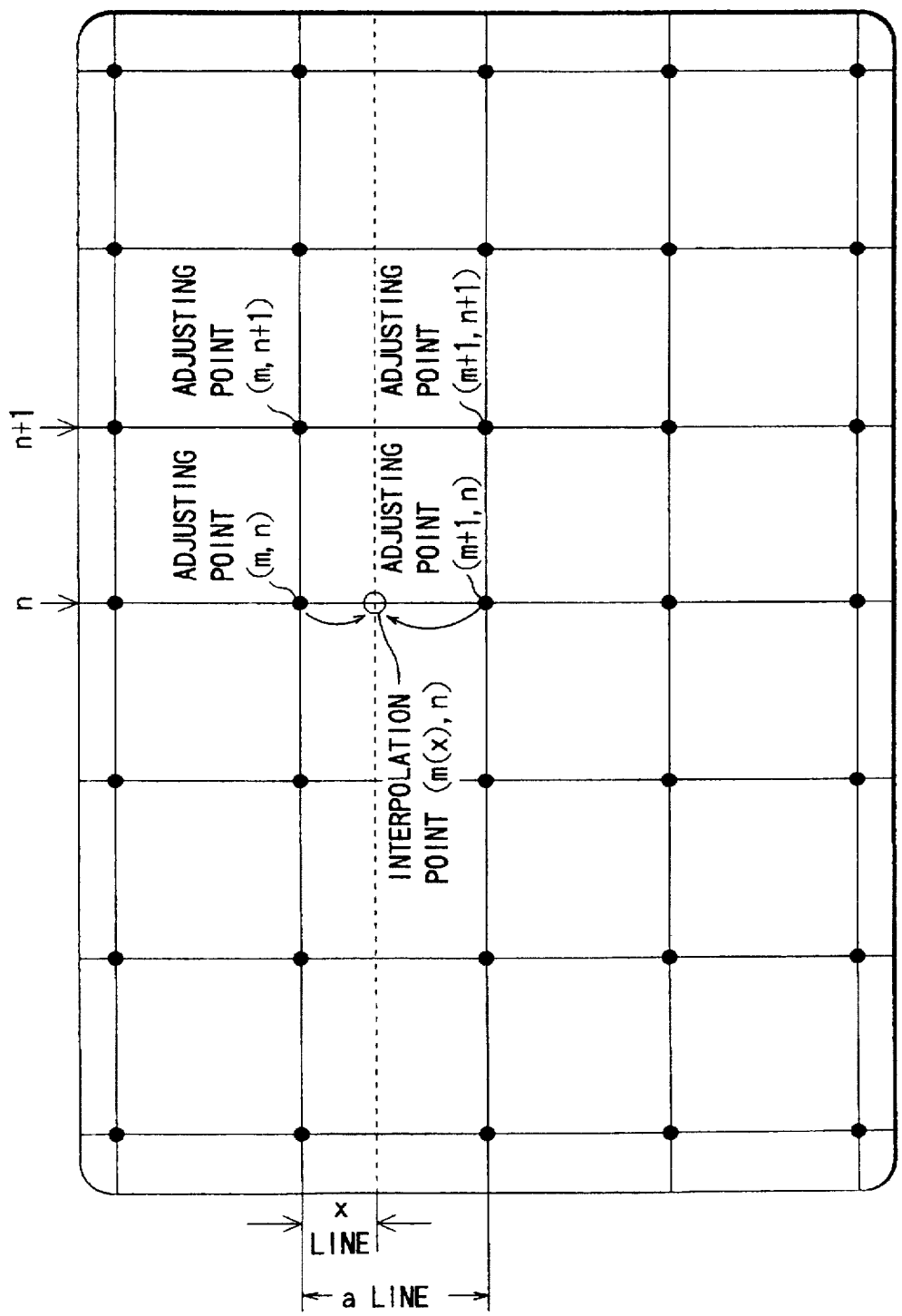
FIG. 2 is a view, useful in explaining the arrangement of adjusting points employed in the invention.

As is shown in FIG. 2, sampling points, called adjusting points, at which adjusting data is sampled, are predetermined on the screen. Thus, convergence correction data $z(m(x), n)$ at an interpolation adjusting point $(m(x), n)$, which is a point on e.g. an x-th line $(0 \leq x < a)$ from an adjusting point $(m, n)$, is given by $$z(m(x), n) = Z(m, n) \times k(x) + Z(m+1, n) \times k(a-x) \tag{1}$$

where $k(x)$ represents a weight coefficient which is predetermined, depending upon how much distance x from the adjusting point $(m, n)$, and "a" is member of lines, between the adjusting point $(m, n)$ and $(m+1, n)$.

The position (coordinates) of each scanning line to be convergence-corrected on the basis of the adjusting data will now be explained.

Suppose that the scanning lines included in a first field are an n-th line, an (n+1)th line, an (n+2)th line, . . . . . Further, suppose that the scanning lines included in a second field and located between the n-th line and the (n+1)th line of the first field, between the (n+1)th line and the (n+2)th line of the first field, between the (n+2)th line and the (n+3)th line of the first field, . . . are an (n+0.5)th line, an (n+1+0.5)th line, an (n+2+0.5)th line, . . . , respectively.

Where that the vertical coordinates of the n-th line and the (n+1)th line are represented by $y(n)$ and $y(n+1)$, respectively, the vertical coordinate $y(n+0.5)$ of the (n+0.5) th line located therebetween is given by $$y(n+0.5) = \{y(n), y(n+1)\}/2 \tag{2}$$

This is an essential condition for performing interlace scanning.

Further, where that the vertical movement amounts of the n-th line and the (n+1)th line as a result of the convergence correction are represented by $\Delta y(n)$, $\Delta y(n+1)$, respectively, and their vertical coordinates after convergence correction by $Y(n)$ and $Y(n+1)$, respectively, the following equations are satisfied:

$$Y(n) = y(n) + \Delta y(n) \tag{3}$$

$$Y(n+1) = y(n+1) + \Delta y(n+1) \tag{4}$$

An explanation will be given of a case where convergence correction is performed using the same interpolation adjusting data in both the first and second fields.

If the same convergence correction amount $\Delta y(n)$ as that used for the n-th line is used for the (n+0.5)th line located between the n-th line and the (n+1)th line, the vertical coordinate $Y(n+0.5)$ of the (n+0.5) line after the convergence correction is given by $$\begin{aligned} Y(n+0.5) &= y(n+0.5) + \Delta y(n) \tag{5}\\ &= \{y(n) + y(n+1)\}/2 + \Delta y(n) \\ &= \{y(n) + \Delta y(n) + y(n+1) + \Delta y(n+1) + \\ &\quad \Delta y(n) - \Delta y(n+1)\}/2 \\ &= \{Y(n) + Y(n+1)\}/2 + \\ &\quad \{\Delta y(n) - \Delta y(n+1)\}/2 \end{aligned}$$

On the other hand, an ideal vertical coordinate $Y(n+0.5)$ for performing correct interlace scanning at the (n+0.5)th line even after the convergence correction should be given by $$Y(n+0.5) = \{Y(n) + Y(n+1)\}/2 \tag{6}$$

However, if the same correction amount $\Delta y(n)$ as used at the n-th line is used at each line included in both the first and second fields, the vertical coordinate $Y(n+0.5)$ of the (n+0.5) th line after the convergence correction is given by the equation (5). The difference $dY$ between the values obtained from the equations (5) and (6) is $$\begin{aligned} dY &= Y(n+0.5) - Y(n+0.5) \tag{7}\\ &= \{\Delta y(n) - \Delta y(n+1)\}/2 \end{aligned}$$

As is evident from this, an error will occur between an ideal line position and the actually corrected line position if convergence correction is performed using the same interpolation adjusting data, irrespective of whether the line is included in the first or second field.

To solve the above problem, different coefficients are used in different fields, respectively, to create the interpolation adjusting data.

Specifically, the odd field coefficient generating ROM 2 stores an interpolation coefficient $ko\{x\}$ ($0 \leq x < a$) for the odd field, while the even field coefficient generating ROM 3 stores an interpolation coefficient $ke\{x\}$ ($0 \leq x < a$) for the even field. Thus, the different coefficients are used in the different fields.

The interpolation adjusting data used in each field is obtained as follows, using the equation (1):

In the odd field:

$$zo(m(x), n) = Z(m, n) \times ko(x) + Z(m+1, n) \times ko(a-x) \tag{8}$$

In the even field:

$$ze(m(x), n) = Z(m, n) \times ke(x) + Z(m+1, n) \times ke(a-x) \tag{9}$$

Thus, the interpolation calculating circuit 60 calculates optimal adjusting data for each line on the basis of the correction principle.

As described above, the invention employs the odd field coefficient generating ROM 2 as first interpolation coefficient generating memory means, the even field coefficient generating ROM 3 as second interpolation coefficient generating memory means, and the field discrimination circuit 4 and the selective circuit 1 as means for selecting one of the outputs of the first and second memory means. With this structure, the invention can perform fine correction in both fields and accordingly obtain an optimal convergence signal free from the pairing phenomenon. Moreover, the plural interpolation coefficient generating memory means are dynamically switched from one to the other in different fields, thereby performing vertical interpolation of adjusting data.

Although in the above embodiment, the interpolation coefficient generating memory means are selectively switched from one to the other in units of a field, the switching may be performed in units of a line. Furthermore, interpolation adjusting data may be prepared beforehand and temporarily stored in a calculating circuit.

Figure 3:
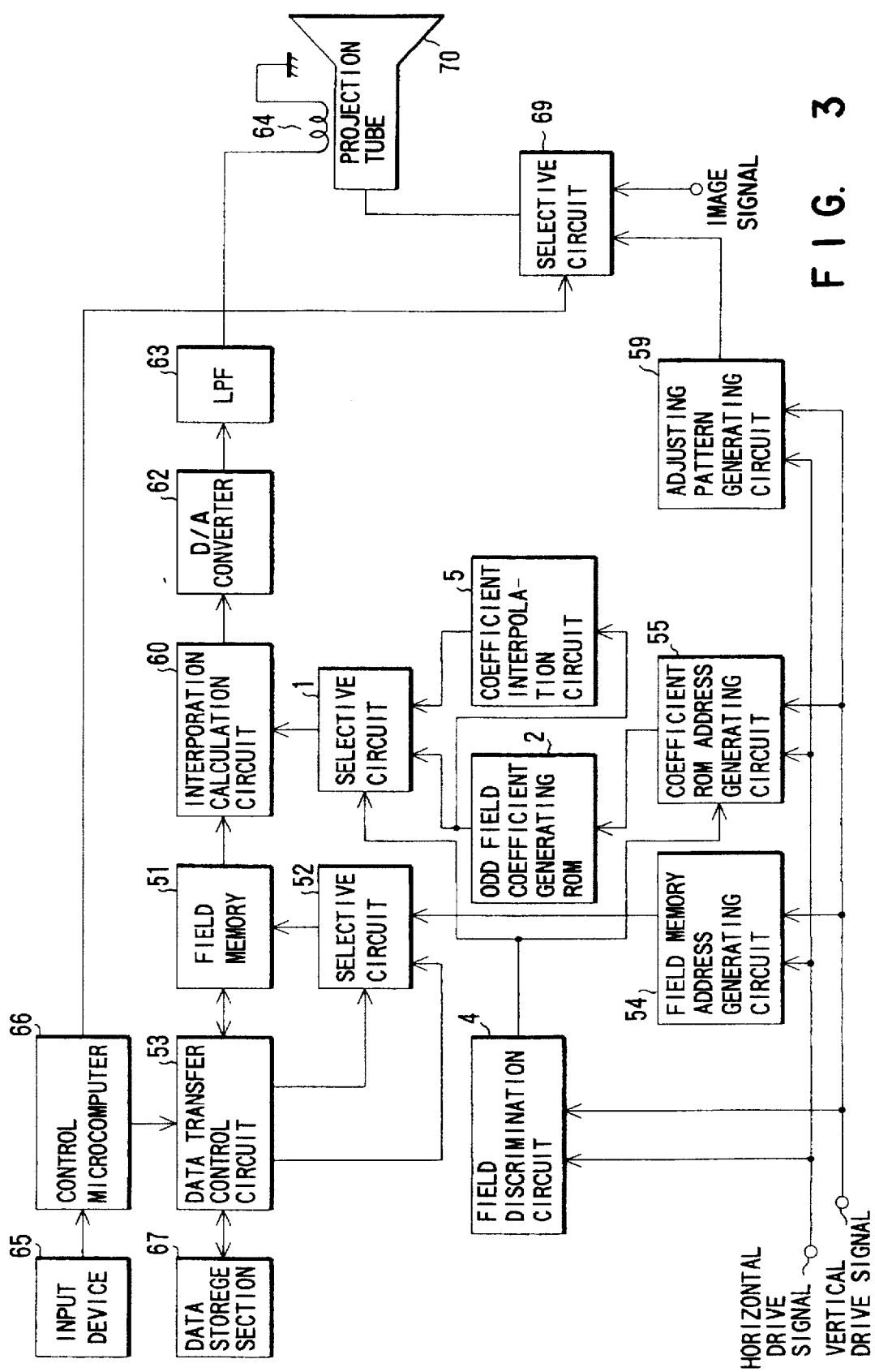
FIG. 3 is a view, showing a second embodiment of the invention.

FIG. 3 shows a second embodiment of the invention.

The second embodiment differs from the first embodiment shown in FIG. 1 in that a coefficient interpolation circuit 5 is used in place with the second interpolation coefficient generating memory means. The coefficient interpolation circuit 5 calculates an average value of two interpolation coefficients successively output from the odd field coefficient generating ROM 2, and supplies the average value to the selective circuit 1.

In this embodiment, considering that there is no great difference between the odd field interpolation coefficient ko(α) and the even field interpolation coefficient ke(α+0.5), the even field interpolation coefficient is obtained using the following approximation:

$$ke(\alpha+0.5)=\{ko(\alpha)+ko(\alpha+1)\}/2 (0\leq\alpha<a) \qquad (10)$$

In other words, optimal interpolation free from the pairing phenomenon can be performed by using, as the even field interpolation coefficient, the average value of the two interpolation coefficients successively output from the odd field coefficient generating ROM 2.

Although in the second embodiment, the coefficient interpolation circuit 5 is used in place with the even field coefficient generating ROM 3 of the first embodiment, the same advantage can be obtained if the coefficient interpolation circuit 5 is used in place with the odd field coefficient generating ROM 2.

Figure 4:
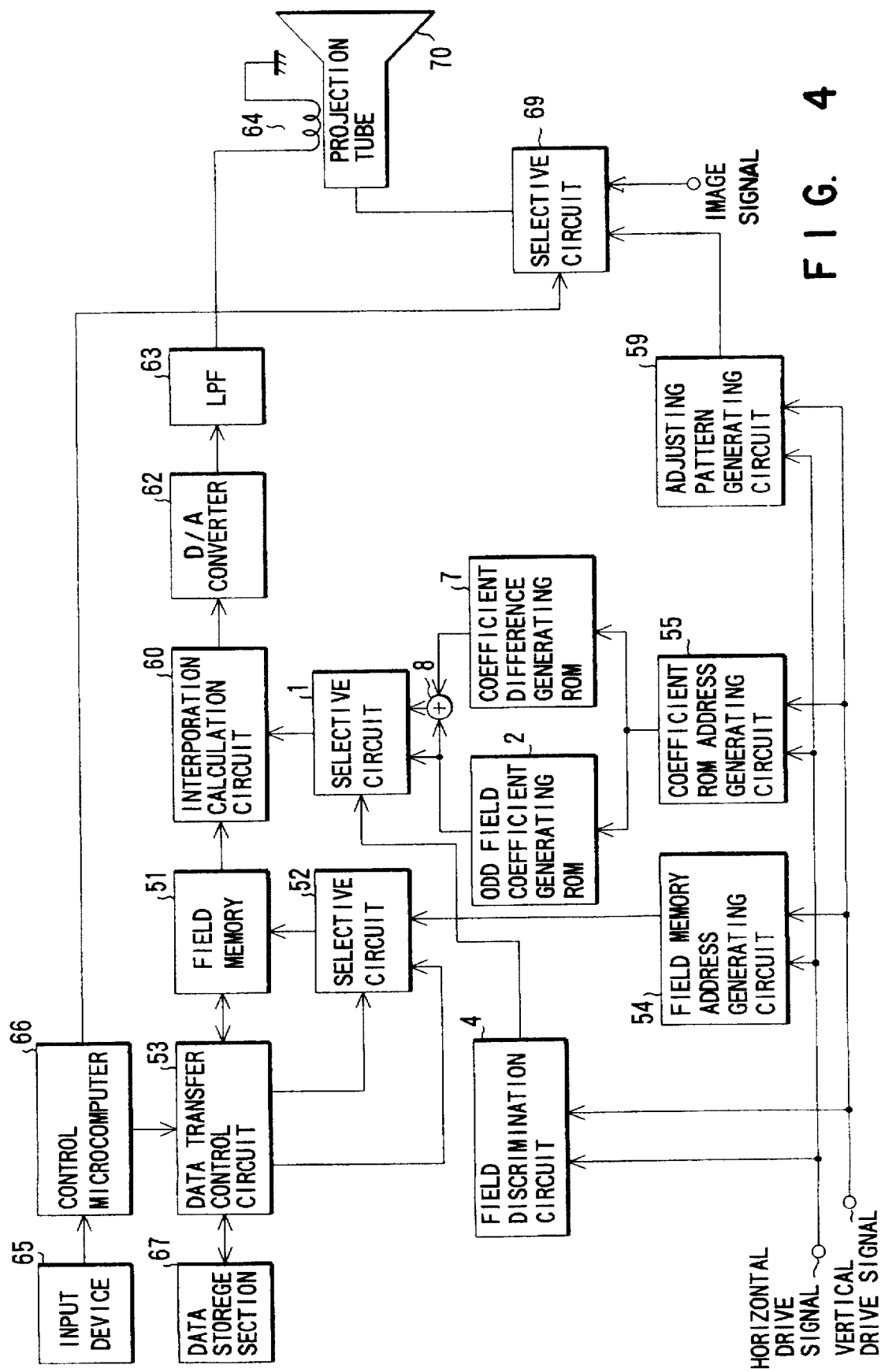
FIG. 4 is a view, showing a third embodiment of the invention.

FIG. 4 shows a third embodiment of the invention.

The third embodiment differs from the first embodiment shown in FIG. 1 in that a coefficient difference generating ROM 7 and an adder 8 are provided in place with the even field coefficient generating ROM 3. The adder 8 adds the output of the odd field coefficient generating ROM 2 to the output of the coefficient difference generating ROM 7, and supplies the addition result to the selective circuit 1. A read address for reading data from the coefficient difference generating ROM 7 is supplied from the coefficient ROM address generating circuit 55.

In the above structure, the difference Δk(α) between the odd field interpolation coefficient ko(α) and the even field interpolation coefficient ke(α+0.5) is stored in the coefficient difference generating ROM 7. Accordingly, an interpolation coefficient for the even field can be obtained by adding the interpolation coefficient ko(α) to the difference Δk(α) by means of the adder 8.

$$ke(\alpha+0.5)=ko(\alpha)+\Delta k(\alpha)(0\leq\alpha<a) \qquad (11)$$

The thus-obtained output of the adder 8 is supplied as the even field interpolation coefficient to the selective circuit 1. Since there is no great difference between the odd field interpolation coefficient ko(α) and the even field interpolation coefficient ke(α+0.5), the absolute value of the difference Δk is extremely low, which enables the employment of a ROM of a small capacity.

Figure 5:
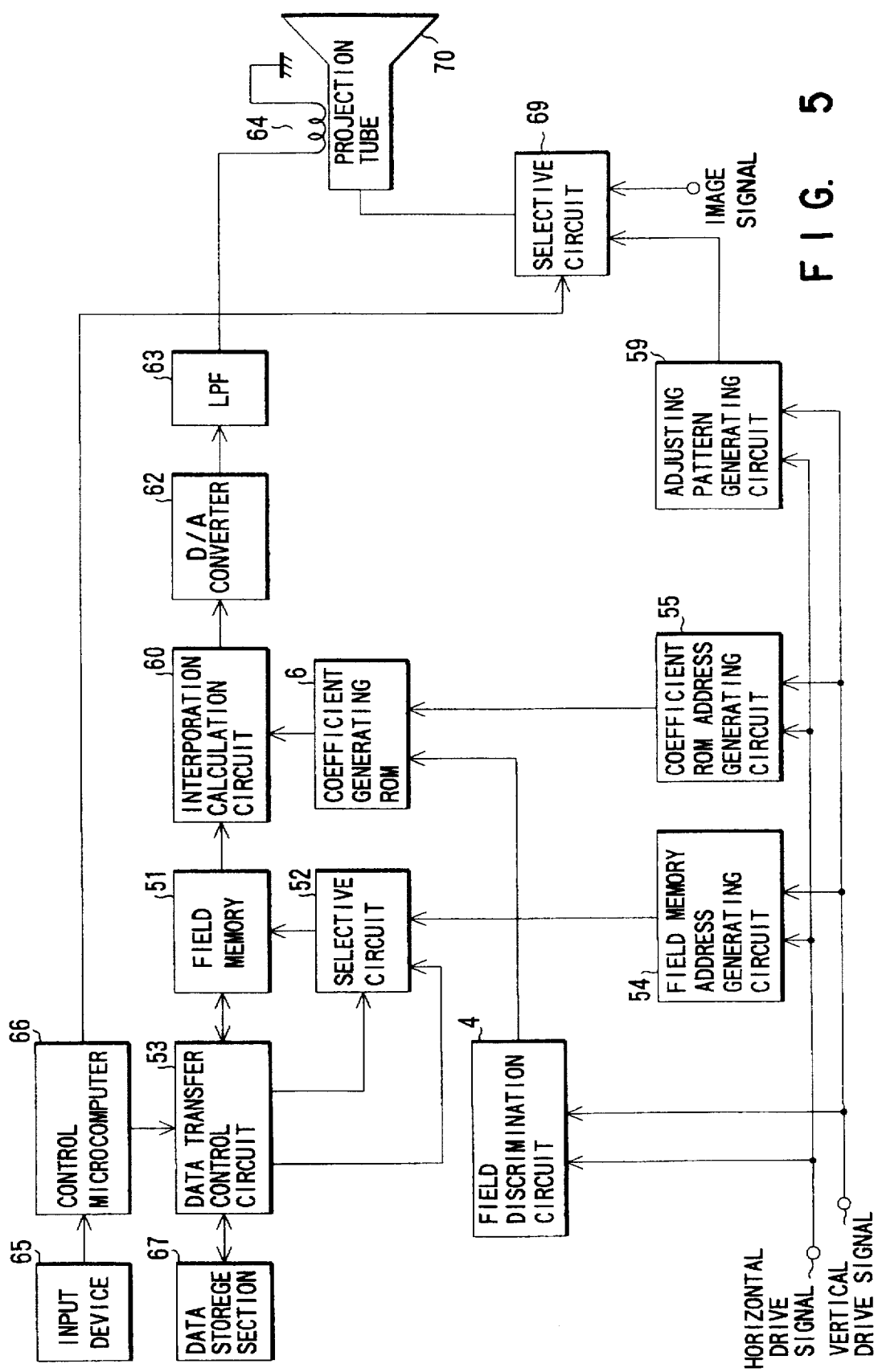
FIG. 5 is a view, showing a fourth embodiment of the invention.

FIG. 5 shows a fourth embodiment of the invention.

As compared with the embodiment of FIG. 1, the fourth embodiment stores both the odd field coefficient and the even field coefficient in a coefficient generating ROM 6. Data obtained by synthesizing the output of the coefficient address generating circuit 55 with the output of the field discrimination circuit 4 is used as the read address. The output of the coefficient generating ROM 6 is supplied to the interpolation calculating circuit 60.

The output of the field discrimination circuit 4 indicates one-bit line data, and the read area of the coefficient generating ROM 6 is changed over in accordance with the contents of the one-bit line data. This embodiment also can perform fine correction and realize optimal convergence correction free from the pairing phenomenon.

Figure 6:
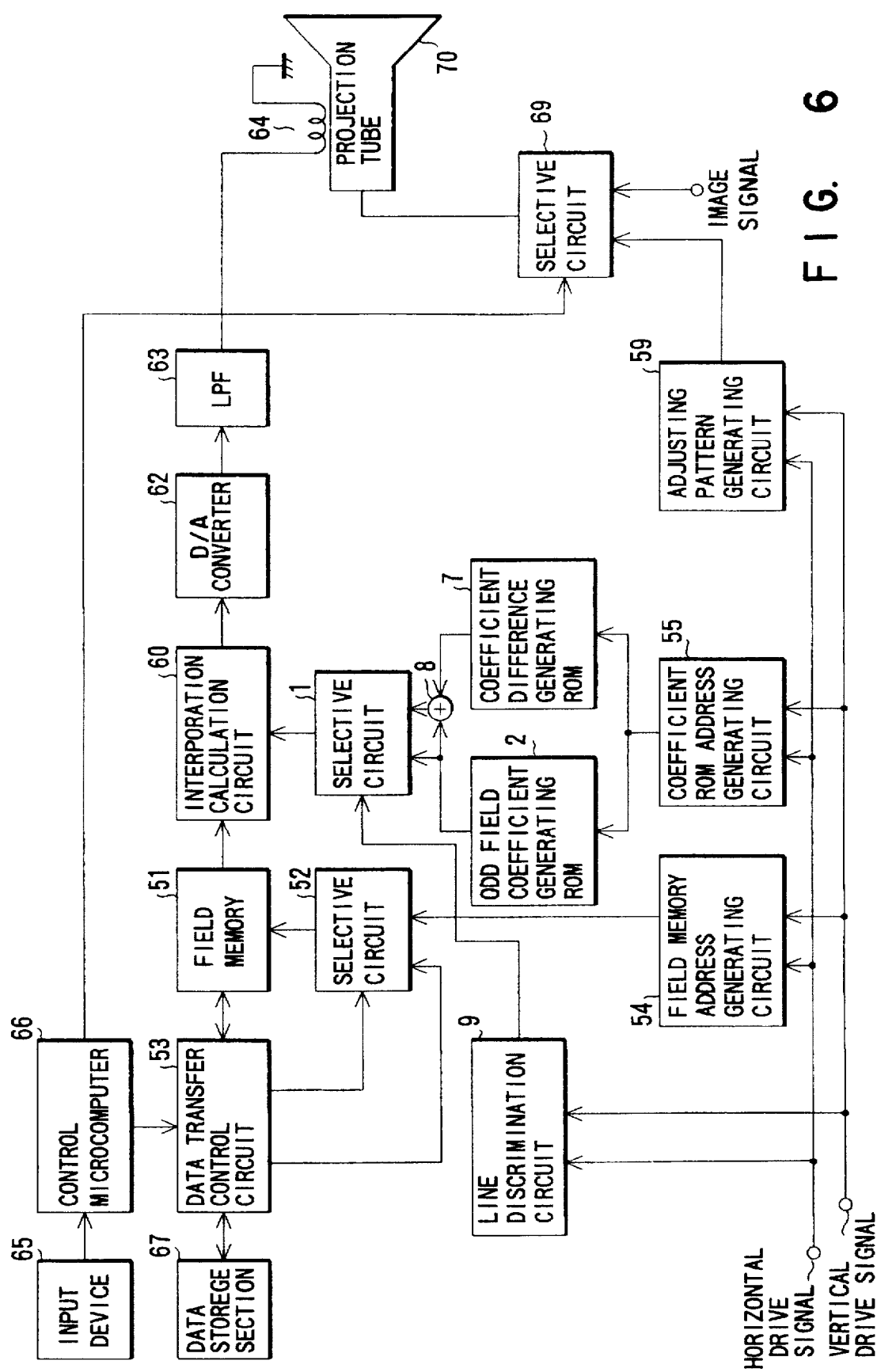
FIG. 6 is a view, showing a fifth embodiment of the invention.

FIG. 6 shows a fifth embodiment of the invention.

In the above-described embodiments, explanations have been given, supposing that the NTSC system for performing interlace scanning is employed therein.

However, the broadcast system is not limited to the NTSC system, but also includes the EDTV-2 system for performing non-interlace scanning. In light of this, it is preferable that the convergence apparatus can perform convergence correction in non-interlace scanning, too.

The EDTV-2 system employs 525 scanning lines in units of one field. In light of this, a line discrimination circuit 9 is provided in place of the field discrimination circuit 4. The line discrimination circuit 9 performs line discrimination using the horizontal drive signal and the vertical drive signal, thereby discriminating interlace scanning from non-interlace scanning. Since in the case of the non-interlace scanning, an image is constituted by 525 scanning lines in units one field, the line discrimination circuit 9 controls the selective operation of the selective circuit 1, depending upon whether the present scanning line is odd-numbered or even-numbered. In other words, the selective circuit 1 generates, at each odd line, the output of the odd field coefficient generating ROM 2, and the output of the adder 8 at each even line. On the other hand, in the case of the interlace scanning, the line discrimination circuit 9 controls the selective operation of the selective circuit 1, depending upon whether the present field is odd-numbered or even-numbered. The selective circuit 1 generates, at each odd field, the output of the odd field coefficient generating ROM 2, and the output of the adder 8 at each even field.

In this embodiment, however, in the non-interlace scanning mode, it is necessary to set the vertical line number counting pitch of each of the field memory address generating circuit 54, to ½ of the pitch employed in the NTSC system. On the other hand, in the interlace scanning mode, the same mode as in the above-described embodiments is used. Thus, it may be constructed such that the line number discrimination signal from the line discrimination circuit 9 is supplied to the control microcomputer 66, which in turn sets a necessary circuit block operation mode in accordance with the contents of the line discrimination signal.

Figure 7:
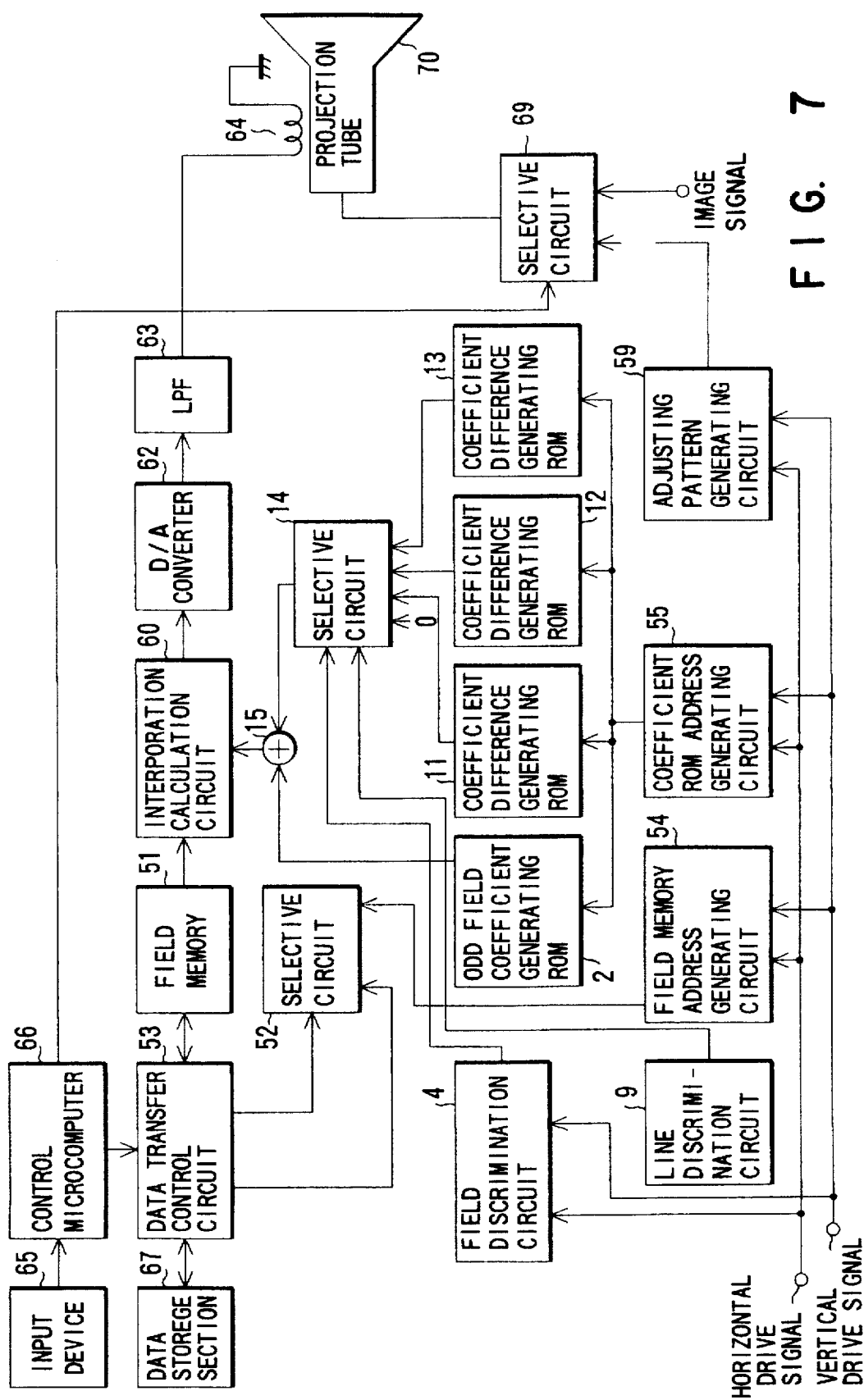
FIG. 7 is a view, showing a sixth embodiment of the invention.

FIG. 7 shows a sixth embodiment of the invention.

This invention can easily be applied to a digital convergence apparatus for the HDTV system. The HDTV system employs 562.5 scanning lines in units of one field, and performs interlace scanning. Therefore, to perform digital convergence correction, it is necessary to employ four types of interpolation coefficient generating ROMs for even lines and odd lines in the odd field, and odd lines and even lines in the even field, respectively.

In FIG. 7, there are provided four types of interpolation coefficient generating ROMs, each of which is contrived to minimize the required data capacity and the size. The output of the odd field coefficient generating ROM 2 is supplied to an adder 15. The ROM 2 stores coefficients for the odd field of the NTSC system. These coefficients are also used as interpolation coefficients for odd lines in the odd field of the HDTV system.

A coefficient difference generating ROM 11 stores the difference between each interpolation coefficient for odd lines in the odd field of the HDTV system and a corresponding interpolation coefficient for even lines in the odd field of the HDTV system. Accordingly, during scanning the even lines in the odd field of the HDTV system, the output of the coefficient difference generating ROM 11 is selected and supplied to the adder 15. Thus, the adder 15 generates coefficients for the odd line and the even line in the odd field of the HDTV system, respectively. During scanning odd lines in the odd field, the operation of the selective circuit 14 is stopped.

A coefficient difference generating ROM 12 stores the difference between each interpolation coefficient for odd lines in the odd field of the HDTV system and a corresponding interpolation coefficient for odd lines in the even field of the HDTV system. Accordingly, during scanning the odd lines in the even field of the HDTV system, the output of the coefficient difference generating ROM 12 is selected and supplied to the adder 15.

A coefficient difference generating ROM 13 stores the difference between each interpolation coefficient for odd lines in the odd field of the HDTV system and a corresponding interpolation coefficient for even lines in the even field of the HDTV system. Accordingly, during scanning the even lines in the even field of the HDTV system, the output of the coefficient difference generating ROM 13 is selected and supplied to the adder 15.

Thus, the adder 15 generates interpolation coefficients for the odd lines and the even lines included in the even field of the HDTV system.

The selective circuit 14 is supplied with the field discrimination signal from the field discrimination circuit 4 and the line number discrimination signal from the line discrimination circuit 9, and functions as described above on the basis of these two signals.

FIG. 8 shows a seventh embodiment of the invention.

The FIG. 8 embodiment is directed to a digital convergence apparatus applicable to the NTSC interlace scanning, the EDTV-2 non-interlace scanning and all HDTV systems.

In this embodiment, the selective circuit 14 is controlled, in the NTSC interlace scanning, by the field discrimination signal from the field discrimination circuit 4, thereby generating a predetermined one of the outputs of the coefficient generating ROMs 11-13. On the other hand, in the EDTV-2 non-interlace scanning, the selective circuit 14 is controlled by the line number discrimination signal from the line discrimination circuit 9, thereby generating a predetermined one of the outputs of the coefficient generating ROMs 11-13.

The type of a TV signal input to the apparatus is determined on the basis of a selection instruction input to the control microcomputer 66 by the user. Upon receiving the input, the microcomputer 66 performs necessary mode setting.

The microcomputer 66 supplies the selective circuit 14 with an instruction to set a mode adapted to each system. To process a TV signal for the NTSC interlace scanning, the selective circuit 14 responds to a field discrimination signal from the field discrimination circuit 4 and selects, for example, the output of the coefficient difference generating ROM 13 during scanning the even field. On the other hand, to process a TV signal for the non-interlace scanning, the selective circuit 14 selects a selection mode as explained above referring to FIG. 6. In this mode, for example, the output of the coefficient difference generating ROM 11 is selected. Further, when a HDTV signal is processed, the mode is switched to that as explained referring to FIG. 7. The field memory generating circuit 54 and the coefficient ROM address generating circuit 55 are controlled so that necessary addresses can be obtained with pitches appropriate to the employed system. More specifically, when the EDTV-2 non-interlace scanning is performed or a HDTV signal is processed, the circuits 54 and 55 are controlled by the control microcomputer 66 so as to set the counting pitch of the vertical line to ½ of that employed at the time of processing the NTSC signal.

As described above, where a TV signal for interlace scanning is processed, the invention can perform optimal convergence in units of one field, which means that the invention is free from degradation of image quality due to the pairing phenomenon. Moreover, the invention can provide a convergence correction signal which is also applicable to the EDTV-2 system and the HDTV system.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A digital convergence apparatus comprising:

adjusting data memory means storing convergence adjusting data for convergence adjustment, which corresponds to each of adjusting points corresponding to points on a display screen;

calculation means for calculating interpolation convergence adjusting data corresponding to correction points located between at least two adjacent ones of the adjusting points, using convergence data corresponding to the at least two adjacent adjusting points;

conversion means for converting a digital signal output from the calculation means, to an analog signal, thereby obtaining a convergence correction signal;

supply means for supplying the convergence correction signal from the conversion means to a convergence correction coil;

discrimination means for discriminating whether an image signal to be displayed on the display screen indicates a point included in a first field or in a second field; and coefficient supply means for setting, in the calculation means, a coefficient for the first field or for the second field on the basis of the discrimination result of the discrimination means.

2. The digital convergence apparatus according to claim 1, wherein the coefficient supply means includes:

first memory means storing coefficients for the first field;

second memory means storing coefficients for the second field; and selective means for selecting one of the outputs of the first and second memory means on the basis of the discrimination result of the discrimination means, and supplying the selected output to the calculation means.

3. The digital convergence apparatus according to claim 1, wherein the coefficient supply means includes:

memory means storing coefficients for the first field;

coefficient interpolation means for calculating those of the coefficients which are output from the memory means, thereby obtaining an interpolation coefficient used as the coefficient for the second field; and selective means for selecting one of the output of the memory means and the output of the coefficient interpolation means on the basis of the discrimination result of the discrimination means, and supplying the selected output to the calculation means.

4. The digital convergence apparatus according to claim 1, wherein the coefficient supply means includes:

first memory means storing coefficients for the first field;

second memory means storing coefficients for the second field, and a difference coefficient indicative of the difference between each coefficient for the first field and a corresponding coefficient for the second field;

adder means for adding the output of the second memory means to the output of the first memory means; and selective means for selecting one of the output of the first memory means and the output of the adder means on the basis of the discrimination result of the discrimination means, and supplying the selected output to the calculation means.

5. The digital convergence apparatus according to claim 1, wherein the coefficient supply means consists of a coefficient generating memory storing coefficients for the first and second fields in respective areas thereof, and changing the area from one to another to read a coefficient stored therein, on the basis of the discrimination result of the discrimination means.

6. A digital convergence apparatus comprising:

adjusting data memory means storing convergence adjusting data for convergence adjustment, which corresponds to each of adjusting points corresponding to points on a display screen;

calculation means for calculating interpolation convergence adjusting data corresponding to correction points located between at least two adjacent ones of the adjusting points, using convergence data corresponding to the at least two adjacent adjusting points;

conversion means for converting a digital signal output from the calculation means, to an analog signal, thereby obtaining a convergence correction signal;

supply means for supplying the convergence correction signal from the conversion means to a convergence correction coil;

discrimination means for discriminating at least whether an image signal to be displayed on the display screen indicates a point on an odd line or on an even line; and coefficient supply means for setting, in the calculation means, a coefficient for the odd line or for the even line on the basis of the discrimination result of the discrimination means.

7. The digital convergence apparatus according to claim 6, wherein the coefficient supply means includes:

first memory means storing coefficients for odd lines included in one field;

second memory means storing a difference coefficient indicative of the difference between each of coefficients for even lines included in the one field and a corresponding coefficient for the odd lines included in the one field;

adder means for adding the output of the second memory means to the output of the first memory means; and selective means for selecting one of the output of the first memory means and the output of the adder means on the basis of the discrimination result of the discrimination means, and supplying the selected output to the calculation means.

8. A digital convergence apparatus comprising:

adjusting data memory means storing convergence adjusting data for convergence adjustment, which corresponds to each of adjusting points corresponding to points on a display screen;

calculation means for calculating interpolation convergence adjusting data corresponding to correction points located between at least two adjacent ones of the adjusting points, using convergence data corresponding to the at least two adjacent adjusting points;

conversion means for converting a digital signal output from the calculation means, to an analog signal, thereby obtaining a convergence correction signal;

supply means for supplying the convergence correction signal from the conversion means to a convergence correction coil;

first discrimination means for discriminating whether an image signal to be displayed on the display screen indicates a point included in a first field or in a second field;

second discrimination means for discriminating at least whether an image signal to be displayed on the display screen indicates a point on an odd line or on an even line; and coefficient supply means for setting, in the calculation means, one of a coefficient for the first field and the odd line, a coefficient for the first field and the even line, a coefficient for the second field and the odd line, and a coefficient for the second field and the even line, on the basis of the discrimination results of the first and second discrimination means.

9. The digital convergence apparatus according to claim 8, wherein the coefficient supply means includes:

first memory means storing coefficients for odd lines in the first field;

second memory means storing a difference coefficient indicative of the difference between each of the coefficients for the odd lines in the first field and a corresponding one of coefficients for even lines in the first field;

third memory means storing a coefficient indicative of the difference between each of the coefficients for the odd lines in the first field and a corresponding one of coefficients for odd lines in the second field;

fourth memory means storing a coefficient indicative of the difference between each of the coefficients for the odd lines in the first field and a corresponding one of coefficients for even lines in the second field;

selective means responsive to the discrimination results of the first and second discrimination means for selecting the output of the second memory means if the discrimination results indicate a point on an even line in the first field, the output of the third memory means if the discrimination results indicate a point on an odd line in the second field, and the output of the fourth memory means if the discrimination results indicate a point on an even line in the second field, and stopping the output operation if the discrimination results indicate a point on an odd line in the first field; and adder means for adding the output of the first memory means to the output of the selective means, and supplying the addition result to the calculation means.

10. The digital convergence apparatus according to claim 9, wherein the selective means refers to a broadcast system designation signal, thereby selecting one of the outputs of the second through fourth memory means.

\* \* \* \* \*